UNITED STATES PATENT OFFICE.

CHARLES M. HALL, OF NIAGARA FALLS, NEW YORK; ARTHUR V. DAVIS, OF PITTSBURGH, PENNSYLVANIA, AND HOMER H. JOHNSON, OF CLEVELAND, OHIO, EXECUTORS OF THE WILL OF SAID CHARLES M. HALL, DECEASED.

METHOD OF TREATING ALUMINOUS MATERIALS OF HIGH SILICA CONTENT.

1,282,222.  Specification of Letters Patent.  Patented Oct. 22, 1918.

No Drawing.  Application filed November 25, 1914.  Serial No. 873,959.

*To all whom it may concern:*

Be it known that I, CHARLES M. HALL, a citizen of the United States, residing at Niagara Falls, in the county of Niagara and State of New York, have invented certain new and useful Improvements in Methods of Treating Aluminous Materials of High Silica Content, of which the following is a full, clear, and exact description.

The invention which forms the subject of the present application relates to the separation of alumina from aluminous materials of high silica content, and its chief object is to provide a method by which the alumina can be separated effectively and economically, thereby making the separation of alumina from such materials as natural clays, low grade bauxites, etc., commercially practicable. A further object is to provide a continuous process for the purpose.

In practising the invention the material to be treated is thoroughly mixed with common salt (NaCl), preferably in the proportion of about 4 molecules of salt to each molecule of alumina ($Al_2O_3$) in the material. The mixture may then be formed into rather thin briquets, which are then dried thoroughly so that they will the better retain their shape in the subsequent heating.

The mixture is then introduced into a shaft furnace or into a rotary kiln and is caused to progress from the inlet to the discharge end by gravity or mechanical agitation, or both, while into the discharge end a current of highly heated gases, for example a flame of producer gas, is introduced together with steam in considerable quantity, the precise amount of steam being immaterial. The rate of passage of the material through the furnace and the heat of the flame being so regulated that the material will be subjected to a temperature of about 1600° to 1700° F. for about 4 hours, the salt (or a large proportion of it) is decomposed, yielding hydrochloric acid which is conducted away and recovered in any convenient manner, as by solution in water or conversion of its chlorin content into chlorid of lime. The sodium freed by the decomposition of the salt unites with the silica and alumina to form a sodium-alumino-silicate.

In heating the material it is not important whether the flame be oxidizing or reducing, and in fact a neutral flame is preferable; but it is found to be highly desirable that the gases admitted to the furnace shall be as free as possible from sulfur, as the latter combines with the sodium making it inactive as regards the alumina.

The solid product discharged from the furnace is disintegrated and mixed with lime (preferably in the form of limestone) in suitable amount, the preferred proportion being such as to give about 2 molecules of CaO to each molecule of silica in the material. Soda in any suitable form, as for example soda ash, is also added and the whole thoroughly mixed, the soda being preferably in the proportion of from 1.5 to 2 molecules of sodium carbonate per molecule of alumina. At times the addition of small quantities of sodium chlorid or sodium sulfate at this stage is beneficial but is not necessary. The mixture is then sintered by passing it through another shaft or rotary furnace at such rate and temperature as to subject it to a heat of from 1300° to 1400° F. for two or three hours. The heating can be effected by a flame of producer gas blown into the furnace as in the first heating, but steam is not used. It is here particularly important that the heating flame contain the minimum amount of sulfur so that the soda will be left free to combine with the alumina to form an aluminate of soda while the lime combines with the silica to form a silicate of calcium.

The sinter as it is discharged from the second furnace or kiln is ground and leached or lixiviated, the leaching liquor being water, or a solution of soda (for example as caustic soda or in any other suitable form), or the residual liquor from the Bayer or Fickes process of alumina precipitation. As is well known, this residual liquor contains caustic soda as well as some alumina. The leaching removes the major portion of the alumina present as a solution of sodium aluminate which is afterward treated by any suitable process, *e. g.* the Bayer or the Fickes process for the recovery of alumina. The residue of the leaching operation consists principally of calcium silicate. In leaching or lixiviating, the liquor should be used in considerable quantities, and the temperature should be about 100° F., as any attempt to get a stronger liquor or a higher temperature reduces the extraction of both alumina and soda. The leaching can be effected continuously in any convenient manner by passing the ground sinter and the leaching liquor in opposite directions through a suitable vessel or chamber.

The economy of the process so far described resides chiefly in the value of its by-products. For example, the hydrochloric acid recovered from the first sintering can be used or sold as such, or the chlorin content thereof can be converted into chlorid of lime (bleaching powder) as a by-product as stated. The solid residue from the leaching or lixiviation, containing lime, silica and some alumina from the clay and the original limestone, can be burned to cement. If it contains too much soda for this purpose after burning (the burning itself will volatilize much of the soda as carbonate or oxid, which can be collected), it can be mixed with additional material (lime and clay) so as to reduce the soda to a harmless proportion. Or before burning it sufficient calcium chlorid can be added to change the soda to sodium chlorid, which will be volatilized. Part or all of the residual Bayer or Fickes liquor can be causticized with milk of lime and the caustic recovered in any convenient manner, or the causticized liquor may be used in soap-making. In causticizing this liquor the residual alumina is precipitated as calcium aluminate, which can be put back into the process before the first or second heating and the lime and soda utilized in that way; or it can be digested with sodium carbonate, yielding sodium aluminate and calcium carbonate, the latter being useful to form part of the lime employed in the process (the $CaCO_3$ being burned to produce $CaO$ during such operation) and the former utilized in the Bayer or Fickes process.

If any difficulty is experienced in securing sufficient penetration of the steam in the first heating, the material can be made more porous by adding small amounts of coke, or gypsum, or calcium chlorid or carbonate. Either or both of the latter can be obtained as by-products of the process, as already explained.

It is to be understood that the invention is not limited to the specific procedure herein described, as various modifications well within the knowledge of persons skilled in the art can be made without departing from the spirit of the invention.

What I claim is:

1. The herein described continuous process of treating aluminous materials of high silica content, comprising mixing the material with common salt in about the proportion of four molecules of salt to one of the alumina present; passing the mixture through a furnace in presence of steam, whereby the salt is decomposed with the formation of a compound of soda, alumina and silica, and the evolution of hydrochloric acid; mixing the solid product with lime and soda; and passing the mixture through a furnace to cause the lime to combine with silica and the alumina to combine with the soda, in whole or in part.

2. The herein described continuous process of treating aluminous materials of high silica content, comprising mixing common salt with the material in the proportion of about four molecules of salt to one of the alumina present; passing the mixture progressively through a furnace in the presence of steam whereby hydrochloric acid and a compound of alumina, soda and silica are produced; mixing the solid product with lime and soda; and passing the mixture progressively through a suitable furnace fired with a substantially sulfurless fuel to produce a compound of calcium and silica and a compound of alumina and soda.

3. The herein described continuous process of treating aluminous materials of high silica content, comprising mixing common salt with the material in the proportion of about four molecules of salt to one of the alumina present; passing the mixture progressively through a suitable furnace fired with sulfurless fuel while blowing steam into the furnace to produce hydrochloric acid and a compound of soda, alumina and silica; mixing lime and soda with the solid product; and passing the mixture progressively through a furnace fired with sulfurless fuel to produce sodium aluminate and calcium silicate.

4. In a process of treating aluminous materials of high silica content, the steps which consist in subjecting to highly heated gases free from sulfur a mixture containing soda, lime, and an alumina-soda-silica compound, to cause the union of the major portion of the alumina with soda, and to cause the union of the major portion of the silica with lime, and dissolving out the alumina as sodium aluminate.

5. In a cyclical process of treating aluminous materials of high silica content, the steps which consist in heating a mixture containing lime, soda, and an alumina-soda-silica compound to dissociate the alumina from the silica; dissolving out the alumina as sodium aluminate; precipitating alumina from the solution; and treating the residual liquor with milk of lime to convert the residual soda into caustic and the residual alumina into calcium aluminate, and reintroducing such aluminate at an earlier stage of the process.

6. In a process of treating aluminous materials of high silica content, the steps which consist in heating a mixture containing lime, soda, and an alumina-soda-silica compound to a sintering temperature.

7. The herein described continuous process of treating aluminous materials of high silica content, comprising mixing the material with common salt in about the proportion of four molecules of salt to one of the alumina present; heating the mixture to a temperature of about 1600 to 1700° F. for about four hours, in the presence of steam, whereby the salt is decomposed with the formation of a compound of soda, alumina and silica, and the evolution of hydrochloric acid; mixing the solid product with lime and soda; and heating this mixture to a temperature of about 1300 to 1400° F. for about two to three hours, to produce soluble sodium aluminate and insoluble calcium silicate, and thereafter leaching the product.

8. In the production of sodium aluminate, the steps of heating a mixture containing an insoluble alumina-soda-silica compound, with lime and soda, to a temperature sufficient to produce calcium silicate and sodium aluminate, and thereafter leaching the product at a temperature of about 100° F.

9. In the production of sodium aluminate, the steps of heating a mixture containing an insoluble alumina-soda-silica compound, with lime and soda, to a temperature sufficient to produce calcium silicate and sodium aluminate, and thereafter leaching the product with a solution of alkali at a temperature of about 100° F.

10. The herein described process which comprises first continuously effecting a reaction in the presence of steam, between NaCl and an aluminous-siliceous material to produce sodium-alumino-silicate; and thereafter reacting upon such product with lime and soda in a continuous operation to form a product containing a water-soluble aluminate of soda and an insoluble silicate of calcium.

11. The herein described process which comprises first continuously effecting a reaction in the presence of steam, between NaCl and an aluminous-siliceous material to produce sodium-alumino-silicate; thereafter reacting upon such product with lime and soda in a continuous operation to form a product containing a water-soluble aluminate of soda and an insoluble silicate of calcium; and leaching such product with an aqueous liquid at a temperature in the vicinity of 100° F., to separate said two materials.

12. In a process of treating aluminous materials of high silica content, the step of heating a mixture comprising lime, soda and an alumina-silica-soda compound, to convert the alumina into a water-soluble compound while leaving the silica in an insoluble state, and thereafter leaching out the water-soluble alumina compound.

In testimony whereof I affix my signature in the presence of two subscribing witnesses.

CHARLES M. HALL.

Witnesses:
 HARRY A. KINCHLEY,
 WILLIAM P. JOHNSON.